United States Patent [19]

Uemiya et al.

[11] Patent Number: 5,345,545
[45] Date of Patent: Sep. 6, 1994

[54] OPTICAL FIBER DEVICE

[75] Inventors: Takafumi Uemiya; Naota Uenishi, both of Osaka, Japan

[73] Assignee: Sumitomo Electric Industries, Ltd., Osaka, Japan

[21] Appl. No.: 115,687

[22] Filed: Sep. 3, 1993

[30] Foreign Application Priority Data

Sep. 3, 1993 [JP] Japan .................................. 4-236132

[51] Int. Cl.$^5$ ........................... G02B 6/02; G02F 1/37
[52] U.S. Cl. .................................... 385/141; 385/122; 385/143; 359/332; 427/571
[58] Field of Search ................ 385/122, 123, 141–145; 359/326, 332, 328; 427/163, 201, 571, 248.1

[56] References Cited

U.S. PATENT DOCUMENTS

| | | | |
|---|---|---|---|
| 5,093,882 | 3/1992 | Asano et al. | 385/125 X |
| 5,097,527 | 3/1992 | Kubata et al. | 385/143 X |
| 5,129,029 | 7/1992 | Uemiya et al. | 385/143 X |
| 5,192,579 | 3/1993 | Uemiya et al. | 385/130 X |

*Primary Examiner*—Akm E. Ullah
*Attorney, Agent, or Firm*—Cushman, Darby & Cushman

[57] ABSTRACT

An optical fiber device comprising an optical fiber comprising a core made of an organic crystal and a cladding made of glass, the device generating second harmonics of a laser light that has been launched into the core, the device further comprising a buffer layer on at least one end faces of the optical fiber, and a water barrier layer on the surface of the buffer layer, the buffer layer being such that the organic crystal of the core is not dissolved therein.

7 Claims, 6 Drawing Sheets

OPTICAL FIBER DEVICE

FIELD OF THE INVENTION

The present invention relates to a novel optical fiber device, more particularly, to an optical fiber device capable of second harmonic generation from incident laser light.

BACKGROUND OF THE INVENTION

Nonlinear optical effects are phenomena in which light entering a medium causes polarization that is proportional to higher-order terms of the square of electric field caused by the incident light. These phenomena lead to the generation of second harmonic waves, sum frequency waves, difference frequency waves, etc.

Those phenomena develop in materials generally called "nonlinear optical materials". Examples of known nonlinear optical materials include inorganic materials such as $KH_2PO_4$, $LiNbO_3$ and $LiTaO_3$. It has recently been found that organic materials such as 2-methyl-4-nitrile-aniline (MNA), 4-dimethylamino-3-acetamidonitrobenzene (DAN) and 3,5-dimethyl-1-(4-nitrophenyl)pyrazole (DMNP) also have large nonlinear optical constants, and increasing attention is being paid to these organic nonlinear optical materials.

Various research efforts are made for applying the organic nonlinear optical materials to optical fiber light wavelength converter devices which are capable of reducing the wavelength of laser light by half. Devices using DAN or DMNP as the organic nonlinear optical material are known as such devices.

Figure 12:
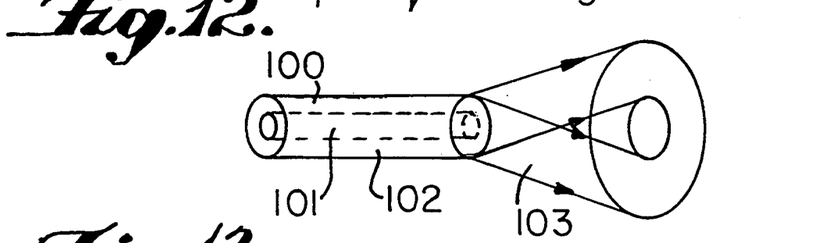
FIG. 12 is a schematic view illustrating second harmonic issuing from a conventional optical fiber device.

It is important to insure high-yield generation of second harmonics in those devices that they should be designed in such a way that the fundamental wave is confined at high energy density and that the interaction between the fundamental wave and harmonics is insures. To meet these requirements, either one of a core and a cladding of an optical fiber is formed of a single-crystal or polycrystalline nonlinear optical material and the other is formed of an amorphous material such as glass, and the fundamental wave is guided through the core, to achieve high conversion efficiency. FIG. 12 shows how the fundamental wave passing through core 101 of optical fiber light wavelength converter device 100 is converted to second harmonic 103 which emerges from the converter. Numeral 102 in FIG. 12 denotes a cladding of device 100.

Figure 13:
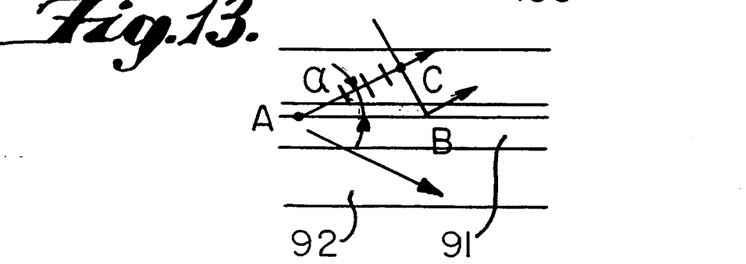
FIG. 13 is schematic view illustrating the mechanism of Cherenkov radiation.

Another requirement for the optical fiber light wavelength converter device is to insure matching of the propagation speed of the fundamental wave and that of the generated second harmonic, i.e., phase matching between them. The mechanism of the phase matching is illustrated in FIG. 13 on the assumption that light propagating through core 91 generates a second harmonic at point A, which leaks into cladding 92 at angle α. If the equiphase plane of this second harmonic agrees with the equiphase plane of another second harmonic that emits in the direction of angle α at point B after the passage of a unit time, second harmonics are radiated in the same direction of angle α (Cherenkov radiation). If the condition of the following equation is satisfied, phase matching is assured automatically to enable Cherenkov radiation:

$$n_S(2\omega) > n_G(\omega) > n_S(\omega)$$

wherein $n_S(\omega)$ represents the refractive index of cladding 92 with respect to the fundamental wave; $n_G(\omega)$ represents the refractive index of core 91 with respect to the fundamental wave; and $n_S(2\omega)$ represents the refractive index of cladding 92 with respect to the second harmonic.

The optical fiber light wavelength converter device uses an organic crystal as the core. This has presented several problems such as evaporation of the crystal from the fiber-ends to lower the coupling efficiency of laser light, and moisture absorption by the crystal to increase guiding loss. JP-A-4-107509 (the term "JP-A" as used herein means an "unexamined Japanese patent application") proposes to solve these problems a method in that an optical fiber is cut in vacuum and a film of $SiO_2$ or $MgF_2$ is formed on the cut end faces, and JP-A-3-199524 propose a method in that the cut end faces of the fibers are coated with a polymer having the organic crystal of the core dissolved therein.

However, in the former method, since the organic crystal usually does not have good compatibility with the inorganic materials such as $SiO_2$ and $MgF_2$, the inorganic film over the organic crystal becomes porous or its thickness decreases to increase the chance of cracking. As a result, it is difficult to achieve complete prevention of the invasion of water which is a cause of device deterioration. In the later method which depends on the coating of a polymer having the organic crystal of the core dissolved therein, the core crystal dissolves or a crystal is deposited on the core crystal depending on temperature variations, whereby not only is the incident efficiency of laser light instabilized but also the device is deteriorated by water contained in the polymer.

SUMMARY OF THE INVENTION

An object of the present invention is to provide an optical fiber device that is protected against deterioration by insuring that aerial moisture will not enter the organic crystal in the core of the fiber.

Other objects and effects of the present invention will be apparent from the following description.

The present invention relates to an optical fiber device comprising an optical fiber comprising a core made of an organic crystal and a cladding made of glass, the device generating second harmonics of a laser light that has been launched into the core, the device further comprising a buffer layer on at least one end faces of the optical fiber, and a water barrier layer on the surface of the buffer layer, the buffer layer being such that the organic crystal of the core is not dissolved therein.

One of the characteristic features of the optical fiber device according to the present invention resides in the presence of a buffer layer between at least one end faces of the device and the water barrier layer. In the case of using an inorganic material to form a water barrier layer, the fitness between the inorganic material and the core crystal is sufficiently improved to enable the formation of a dense and high-quality water barrier layer. When the water barrier layer is made of a polymer, it is possible to prevent the evaporation of the core crystal and its dissolution into the water barrier layer.

DETAILED DESCRIPTION OF THE INVENTION

Figures 1, 2A, 2B:
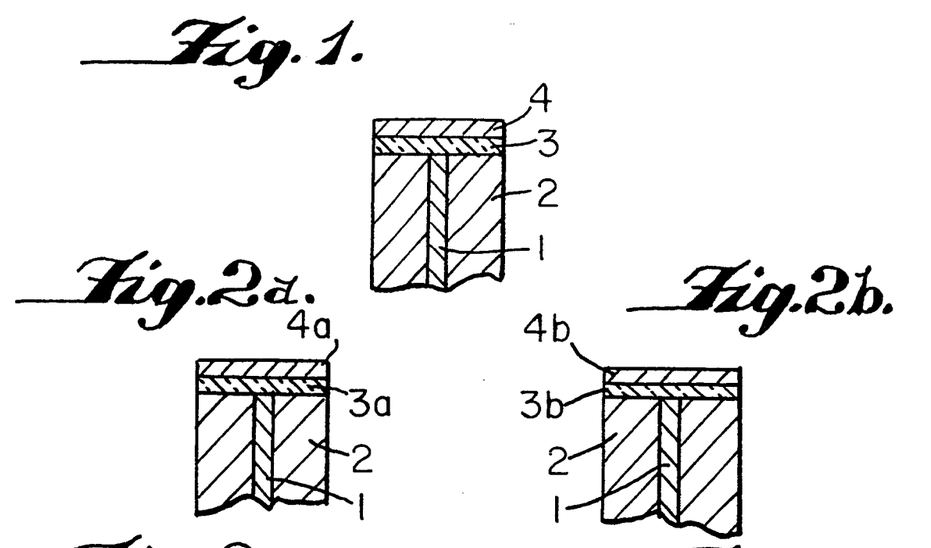
FIG. 1 shows a cross-sectional view of an optical fiber device according to an embodiment of the present invention.

FIG. 1 shows an embodiment of the present invention, in which an optical fiber device composed of core 1 and cladding 2 is provided on the end face thereof with buffer layer 3 and water barrier layer 4 in this order. Glass constituting cladding 2 is not particularly limited, and examples thereof include lead glass (super flint glass) mainly composed of Pb, K, Na, Si, Ti and O.

If water barrier layer 4 is made of an inorganic dielectric material, buffer layer 3 is preferably selected from materials that ensure the compatibility to the inorganic dielectric material and the core crystal. Examples of such materials include a monomolecular layer of a silane coupling agent, and a silicone composition film formed by plasma-assisted CVD from the decomposition product of a silane compound, so as to have a property intermediate between those of organic and inorganic compounds.

Examples of the silane coupling agent include compounds represented by the following general formula:

$Si(R)_m(X)_{4-}$ wherein m represents a natural number, R represents an organic functional group such as a methyl group, an ethyl group or an aryl group that will not react with glass, and X represents a halogen atom or a functional group such as a methoxy group or an ethoxy group that reacts with glass. If a plurality of groups represented by R are bonded to Si, they may be independently the same or different groups. Other examples of the compounds that is used as silane coupling agents include $(H_3CSi)_2N$.

The monomolecular layer of a silane coupling agent can be formed by coating a solution of the silane coupling agent on the end face of the device, or by exposing the end face to a vapor of the silane coupling agent, whereby reacting the silane coupling agent with hydroxyl groups on the end face of the device. The monomolecular layer of a silane coupling agent generally has a thickness of about several tens Å or less.

Examples of the silane compound for forming a silicone composition film include $Si(CH_3)_4$, $Si(OCH_3)_4$, $Si(OCH_2CH_3)_4$, $Si(CH_3)_3O_2$ as well as the above-mentioned silane coupling agents. When these silane compounds are decomposed with $O_2$ plasma, silicone compositions are produced that have —OH, —$CH_3$, —CN or other organic functional groups incorporated into the three-dimensional network structure of $SiO_2$. The amounts of organic functional groups to be incorporated can be controlled by adjusting the $O_2$ pressure and the plasma power. The thickness of the silicone composition film is generally 1 μm of less, and preferably 0.1 μm or less.

The silane coupling agent and the silicone composition described above have structures that have good compatibility with both glass and the organic crystal; hence, the fitness between the organic crystal and the inorganic water barrier layer is improved to thereby enhance the quality and bonding strength of the inorganic water barrier layer. In the case of an organic water barrier layer, the fitness between the organic barrier layer and glass is improved.

While the buffer layer may be composed of the silane coupling agent or the silicone composition alone, it may comprise a monomolecular layer of a silane coupling agent and a silicone composition film formed on the monomolecular layer. The thus formed silicone composition film has better quality that contributes a further improvement in the quality of the water barrier layer made of the inorganic film.

Semiconductors such as amorphous silicone (a-Si), ZnS and ZnSe can form good films on all materials available and, hence, can be used to form the buffer layer. Since metals absorb the fundamental wave ($\lambda = 0.8$ to 1.1 μm) and second harmonics, they can be used as the buffer layer, if they are in the form of extremely thin films not thicker than 50 Å. In contrast, a-Si, ZnS and ZnSe do not absorb the fundamental wave and, therefore, their films can be formed without any limitation on thickness and may be used with particular advantage on the entrance side of fibers.

Water barrier layer 4 should be made of a material that is transparent in the visible and near infrared wavelength regions. Examples of such materials include inorganic materials having low water permeability coefficient such as $SiO_2$, $MgF_2$, $Y_2O_3$, $Al_2O_3$ and ZnO, as well as fluorine-containing water-repellent organic materials. These materials exhibit satisfactory performance even if they are used alone. However, films of inorganic materials may have pinholes if they are thin and separation may occur if they are thick, and films of organic materials may pick up water with lapse of time. Under these circumstances, a water barrier layer having a laminated structure comprising an inorganic material film and an organic material film is preferred, since a device of a longer life can be produced.

Thin films of organic materials can be formed by vapor-phase processes including vacuum evaporation, sputtering, plasma-assisted CVD, ionized cluster beam (ICB) deposition, and electron cyclotron resonance (ECR).

Examples of the organic materials for forming water barrier layer 4 include solvent-soluble fluorine resin (e.g., "Teflon AF", the trade mark of E. I. Dupont) and fluorine-containing polymer compositions. Since fluorine-containing polymers are usually solid, it is preferred to dissolve the polymers in monomers and polymerize the monomers, and crosslink the polymerized monomers to cure. Examples of the monomers include fluorine-containing vinyl monomers and fluorine-containing divinyl monomers. Examples of the polymers include fluorine-containing polymers such as polyacrylate fluoride and polyvinylidene fluoride.

In order to provide better adhesion to the material which is in contact with the water barrier layer, silane coupling agents such as trivinyl monoethoxysilane ($Si(CH=CH_2)_3OC_2H_5$) may be mixed in the monomers. To polymerize monomers containing silane coupling agents, photopolymerization by exposure to ultraviolet radiation is preferred. Examples of the photoinitiator which may be added to monomers include a compound represented by the following formula:

The method of coating polymers is not particularly limited and any conventional coating means may be adopted. The spin coating is the most preferred for the purpose of producing a smooth surface.

When the buffer layer is composed of a silicon-containing material, fluorine-containing silane coupling agents may be used. Examples of the fluorine-containing silane coupling agents include $CF_3(CF_2)_5CH_2CH_2SiCl_3$, $CF_3CH_2CH_2Si(OCH_3)_3$, $CF_3(CF_2)_5CH_2CH_2Si(OCH_3)_3$ and $CF_3CH_2CH_2SiCl_3$.

FIGS. 2(a) to 2(e) show various embodiments of the combination of buffer layer 3 and water barrier layer 4. In FIGS. 2(a) to 2(e), numeral 1 denotes a core and 2 denotes a cladding.

Figure 2C:
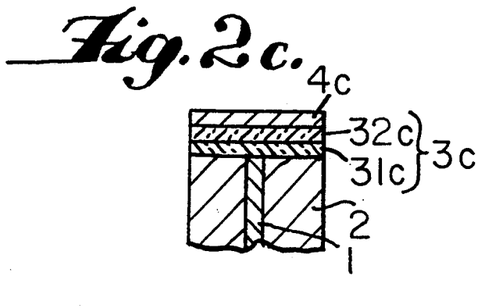
FIG. 2 shows in cross section various embodiments of the arrangement of the water barrier layer and the buffer layer in the optical fiber device according to the present invention.
Figure 2D:
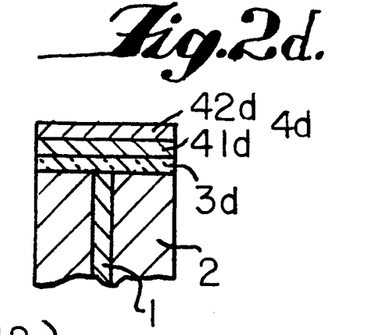
Figure 2E:
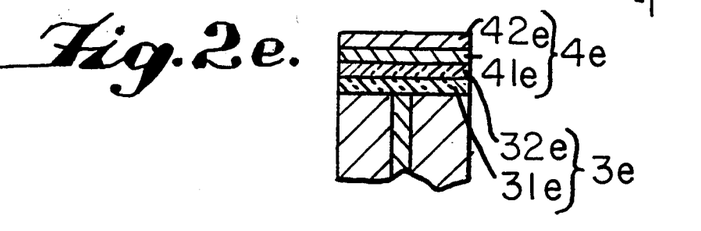

FIG. 2(a) shows an embodiment where the surface of buffer layer 3a composed of a monomolecular layer provided on an end face of the device is overlaid with water barrier layer 4a composed of an inorganic material;

FIG. 2(b) shows an embodiment where the surface of buffer layer 3b composed of a silicone composition is overlaid with water barrier layer 4b;

FIG. 2(c) shows an embodiment where the surface of buffer layer 3c composed of monomolecular layer 31c and silicone composition film 32c is overlaid with water barrier layer 4c;

FIG. 2(d) shows an embodiment where the surface of buffer layer 3d made of a monomolecular layer is overlaid with water barrier layer 4d composed of inorganic material layer 41d and organic material layer 42d; and FIG. 2(e) shows an embodiment where the surface of buffer layer 3e composed of monomolecular layer 31e and silicone composition film 32e is overlaid with water barrier layer 4e composed of inorganic material layer 41e and organic material layer 42e.

Water barrier layer 4 and buffer layer 3 are so thin that if dust particles collect on the core crystal at the entrance end face or if flaws develop in the barrier layer and buffer layer, the coupling efficiency of the fundamental wave will immediately drop. Another trouble may occur at the exit end face if water barrier layer 4 is formed of a fluorine resin by spin coating, because the film thickness slightly varies to introduce variations at the wavefronts of second harmonics, thereby lowering the light collecting characteristics of the device. To avoid these problems, a protective layer is preferably formed on the surface of the water barrier layer. Such protective layers may be prepared from a glass plate or a transparent resin such as polymethyl methacrylate each having a thickness of 0.1 to several millimeters.

Figure 3A:
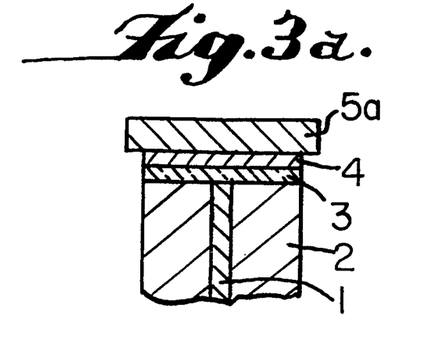
FIG. 3 shows in cross section embodiments of an optical fiber device according to the present invention where a protective layer is provided.
Figure 3B:
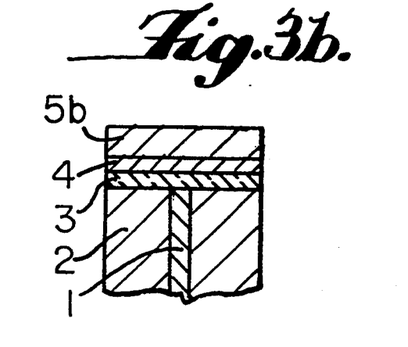

FIG. 3(a) shows an embodiment where a protective layer 5a made from a glass plate is provided on water barrier layer 4, and FIG. 3(b) shows an embodiment where a protective layer 5b made from a polymer plate is provided on water barrier layer 4. As shown by arrows in FIGS. 3(a) and 3(b), the protective layer greatly increases the distance over which aerial moisture must diffuse to reach core crystal 1 and this renders the device less susceptible to deterioration.

Figure 4:
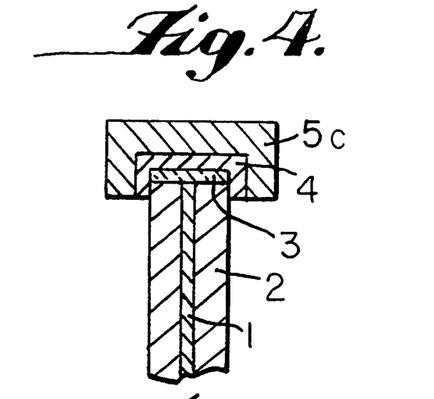
FIG. 4 shows in cross section another embodiment of an optical fiber device according to the present invention where a protective layer is provided.

The shape of the protective layer may be rendered a cap-like form as shown by 5c in FIG. 4, i.e., the protective layer covers not only the end face of the optical fiber but also part of its lateral side. By using such an arrangement, the distance over which aerial moisture must diffuse to reach core crystal 1 can be further increased to provide an even better condition for preventing the deterioration of the device. In this case, the water barrier layer 3 can also serve as an adhesive.

A further problem with the conventional optical fiber device is that if the device is placed in an environment having temperature cycles (repeated temperature changes), the core crystal will expand or contract with respect to the-cladding glass, eventually causing the inorganic water barrier layer to rupture. The formation of the protective layer offers an advantage of reinforcing the water barrier layer to increase its resistance to rupture under temperature cycles.

If the protective layer is made of glass, the fluorine resin used to form the water barrier layer may be used as an adhesive or, alternatively, a conventional adhesive may be used. If the protective layer is made of a polymer, an adhesive may be employed. Alternatively, if the working temperature of the polymer is lower than the melting point of the core crystal, the polymer may be directly injection molded over the water barrier layer.

Figure 5:
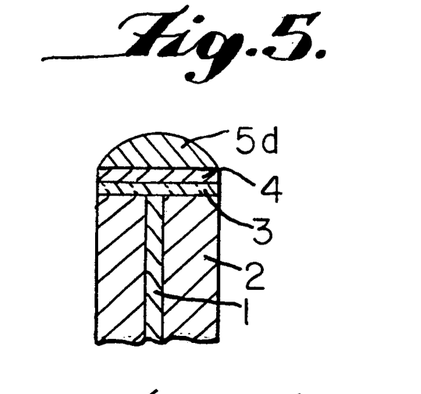
FIG. 5 shows a cross-sectional view showing an embodiment of the profile of a protective layer as it is provided at the entrance end face of the optical fiber device according to the present invention.
Figure 6:
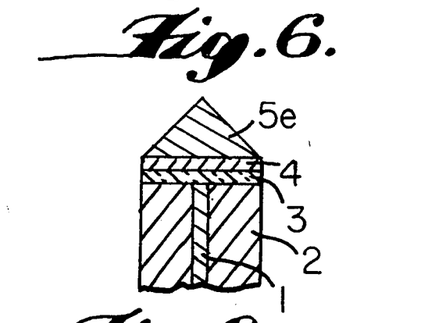
FIG. 6 shows cross-sectional views showing embodiments of the profile of a protective layer as it is provided at the exit end face of the optical fiber device according to the present invention.
Figure 6B:
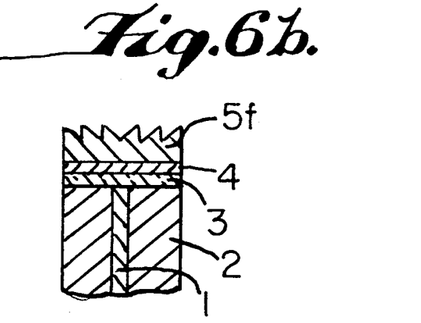

The protective layer may have various shapes. It may be lens-shaped as shown by in 5d in FIG. 5 and this is provided advantageously at the entrance end. At the exit end, the protective layer may have functions as a lens for collimating the second harmonics, such as a form of conical prism as shown by 5e in FIG. 6(a) or a form of a Fresnel lens having concentric steps provided on the same pitch as shown by 5f in FIG. 6(b).

In order to insure that laser light is launched into the core with high efficiency, a de-reflection film may be formed by the combinations of the refractive indices and the film thickness of buffer layer 3, water barrier layer 4, and protective layer 5a, 5b, 5c, 5d, or 5e, if provided. The term "de-reflection film" used herein means a thin film of a material having a low refractive index that is formed on a substrate, and the reflectance of which varies with its film thickness but which provides a lower reflectance of the substrate than when no such film is provided. The condition for a single layer thin film to work as a de-reflection film is given by the following equation:

$$nd = \left(\frac{1}{4} + \frac{m}{2}\right)\lambda$$

wherein n represents the refractive index of the film; d represents the thickness of the film; λ represents the wavelength of the light; and m represents an integer. Methods of designing a multi-layers de-reflection film are described in S. Fujiwara, *Koqaku Hakumaku* (Optical Thin Films)", pp. 98 to 111, Kyoritsu Shuppan K. K.

A single-layered de-reflection film may be designed if buffer layer 3 is an extremely thin monomolecular layer and water barrier layer 4 is made of $SiO_2$ in the absence of a protective layer, or if buffer layer 3 is made of a silicone composition and water barrier layer 4 is made of $SiO_2$, with the two layers having very low refractive indices. If a protective layer as thick as 1 to 2 mm is provided, the buffer layer and the water barrier layer may combine to insure de-reflection of the protective layer, which in turn may be overlaid with a de-reflection film against air.

The following examples are provided for the purpose of further illustrating the optical fiber device of the present invention but are in no way to be taken as limiting.

EXAMPLE 1

Powder of DMNP was melted in vacuum and the resulting melt was sucked into a capillary made of SF11 glass (outer diameter: 1.5 mm; core diameter: 3.5 μm) by capillarity. The capillary was gradually cooled from one end thereof to grow a single crystal DMNP within the capillary.

The optical fiber unit obtained was placed in a vacuum chamber ("PD 103" produced by Samuko International Inc.) and cut by the method described in JP-A-4-107509 under an atmosphere of an oxygen ($O_2$) pressure of 0.4 Torr and a tetramethylsilane (TMS) pressure of 0.2 Torr. Thereafter, a plasma of 20 W was generated. Then minutes later, the plasma generation was turned off and the optical fiber unit was taken out of the vacuum chamber. A silicone composition was deposited in a thickness of 0.2 μm at an end face of the unit. A silicone composition was also deposited at the other end face by the same procedure, thereby forming a buffer layer at both ends of the unit having a length of 2 mm.

In the next step, a fluorine-containing polymer composition having the formulation shown in Table 1 below was spin coated (5,000 rpm) on the buffer layers to form a film, which was then cured by exposure to ultraviolet radiation to form a water barrier layer. The barrier layer was provided on both end faces of the optical fiber unit to complete an optical fiber light wavelength converter device according to the present invention.

Figure 7:
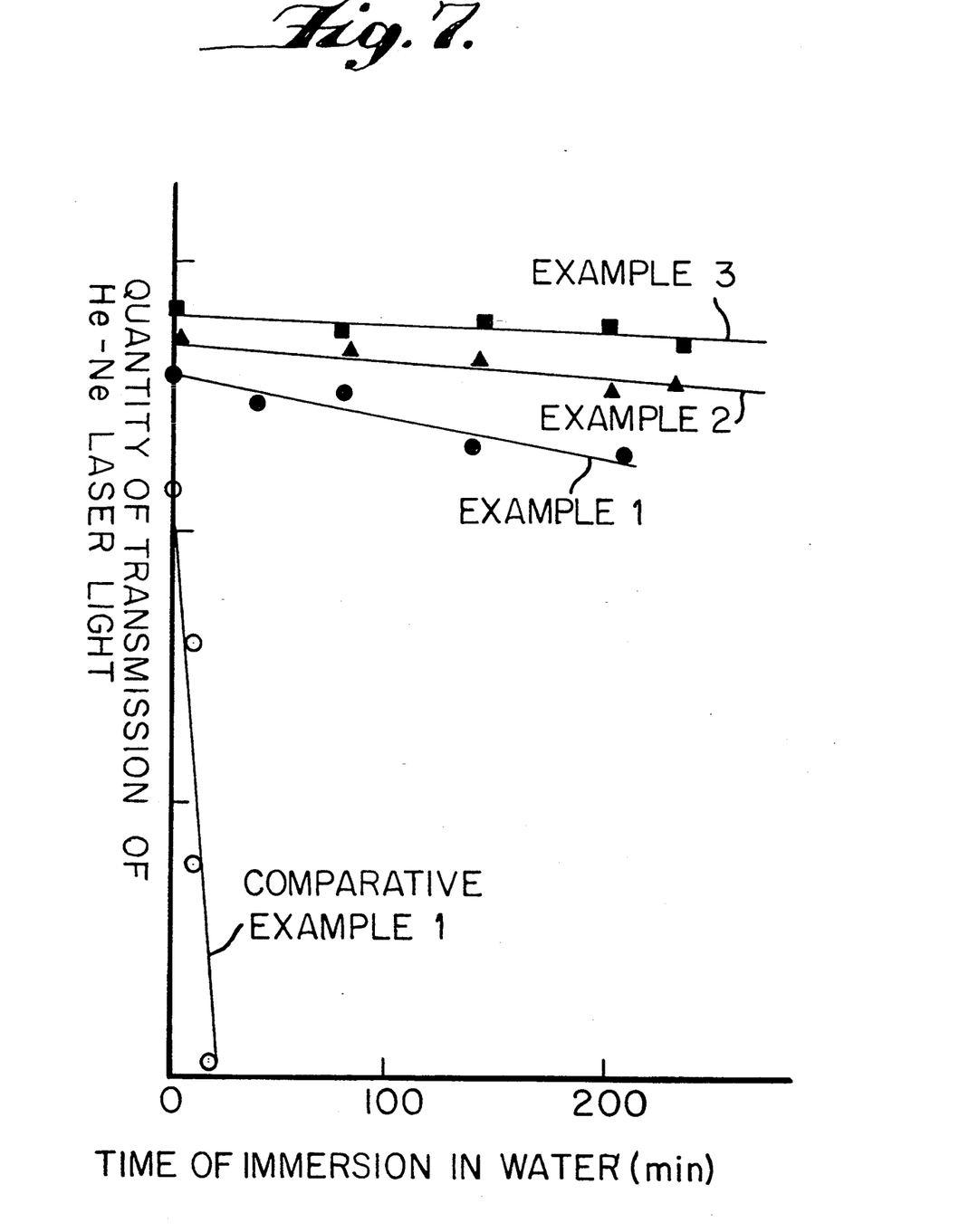
FIG. 7 is a graph showing the results of tests conducted to evaluate the deterioration characteristics of the devices fabricated in Examples 1 to 3.

The device was evaluated in such a manner that it was immersed in water at room temperature for a specified time and tested for its deterioration characteristics by measuring the quantity of transmission of He—Ne laser light. The result is shown in FIG. 7.

TABLE 1

| Compound | Parts by weight |
| --- | --- |
|  | 10 |
|  | 14 |
| $CH_2=CHCOOCH_2(CF_2)_6CH_2OOCCH=CH_2$<br>$CH_3CH_2C(CH_2OOCCH=CH_2)_3$ | 64<br>5 |
|  | 5 |
| $(CH_2=CH)_2Si(OCH_3)_2$ | 2 |
| x/y/z = 1/8/1 | |

EXAMPLE 2

An optical fiber unit was fabricated and provided with a buffer layer of silicone composition at both ends by the same procedure as in Example 1. A $SiO_2$ film was formed on each buffer layer at a deposition rate of 10 Å/sec to give a total thickness of 1,500 Å by means of an electron beam evaporator. The resulting optical fiber light wavelength converter device was evaluated in the same manner as in Example 1. The results obtained are shown in FIG. 7.

EXAMPLE 3

The same procedure as in Example 2 was repeated except that $SiO_2$ was replaced by $Al_2O_3$ which was deposited at a rate of 10 Å/sec to give a total thickness of 1,500 Å. The resulting optical fiber light wavelength converter device was evaluated in the same manner as in Example 1. The results obtained are shown in FIG. 7.

EXAMPLE 4

Figure 9:
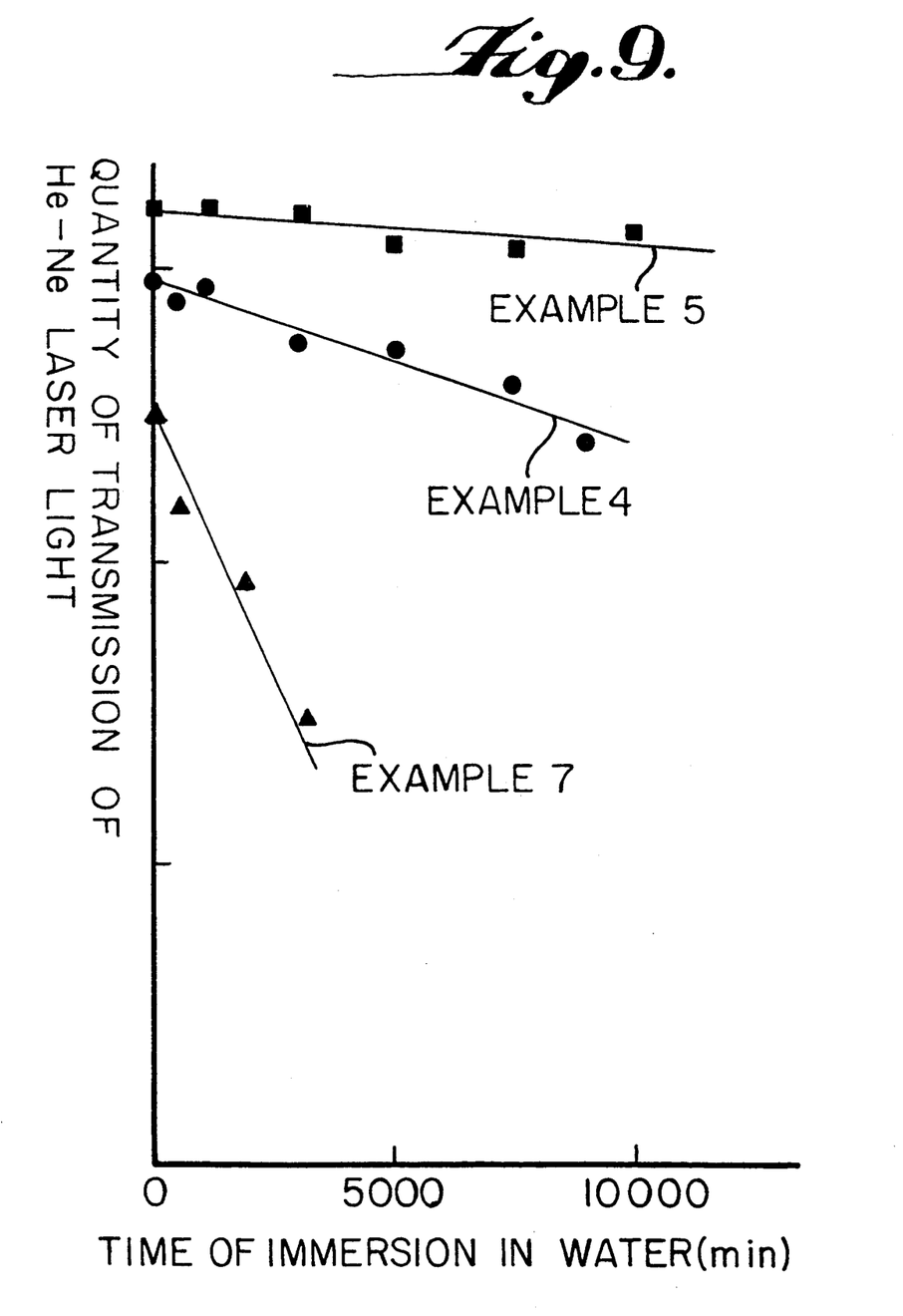
FIG. 9 a graph showing the results of tests conducted to evaluate the deterioration characteristics of the devices fabricated in Examples 4, 5 and 7.

An optical fiber light wavelength converter device was fabricated in the same manner as in Example 2. A fluorine-containing polymer composition having the same formulation as used in Example 1 was applied to both end faces of the device and cured by exposure to ultraviolet radiation. The resulting converter device was evaluated in the same manner as in Example 1. The results obtained are shown in FIG. 9.

EXAMPLE 5

An optical fiber light wavelength converter device was fabricated in the same manner as in Example 2 except that one end face thereof was polished. A fluorine-containing polymer composition having the same formulation as used in Example 1 was applied to both ends of the device, which is then covered with soda-lime glass 0.2 mm thick, followed by curing.

Figure 8:
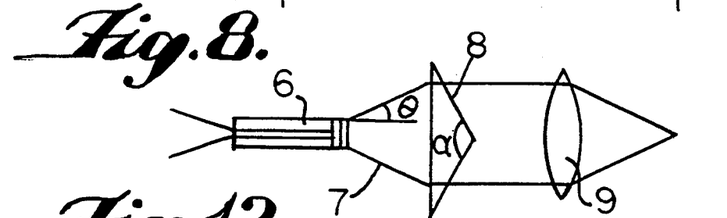
FIG. 8 a schematic view illustrating the light collecting mechanism adopted in Example 5.

The resulting converter device had a length of 2 mm, with the polished end face serving as an exit face. Light (960 nm) from Ar laser excited Ti:Al$_2$O$_3$ laser was launched into the device, from which second harmonics 7 emerged at $\theta = 23°$, as shown in FIG. 8. Second harmonics 7 issuing from device 6 were passed through conical prism 8 ($\alpha = 140°$) to produce parallel beams, which were collected by spherical lens 9 to produce a small spot of diffraction limit.

The device was also evaluated in the same manner as in Example 1. The results obtained are shown in FIG. 9.

EXAMPLE 6

An optical fiber light wavelength converter device was fabricated in the same manner as in Example 5 except that the soda-lime glass was replaced by a conical prism of $\alpha = 140°$. Beams of parallel light emerged from the end face and could be collected up to diffraction limit.

COMPARATIVE EXAMPLE 1

An optical fiber light wavelength converter device was fabricated in the same manner as in Example 1 except that no water barrier layer was provided. The device was evaluated in the same manner as in Example 1. The results obtained are shown in FIG. 7.

EXAMPLE 7

An optical fiber light wavelength converter device was fabricated in the same manner as in Example 2. The device was immersed in a 1 wt % solution of CF$_3$(CF$_2$)$_5$CH$_2$CH$_2$SiCl$_3$ in hexane, followed by drying. The resulting converter device had better water repellency. The device was also evaluated in the same manner as in Example 1. The results obtained are shown in FIG. 9.

COMPARATIVE EXAMPLE 2

Figure 10:
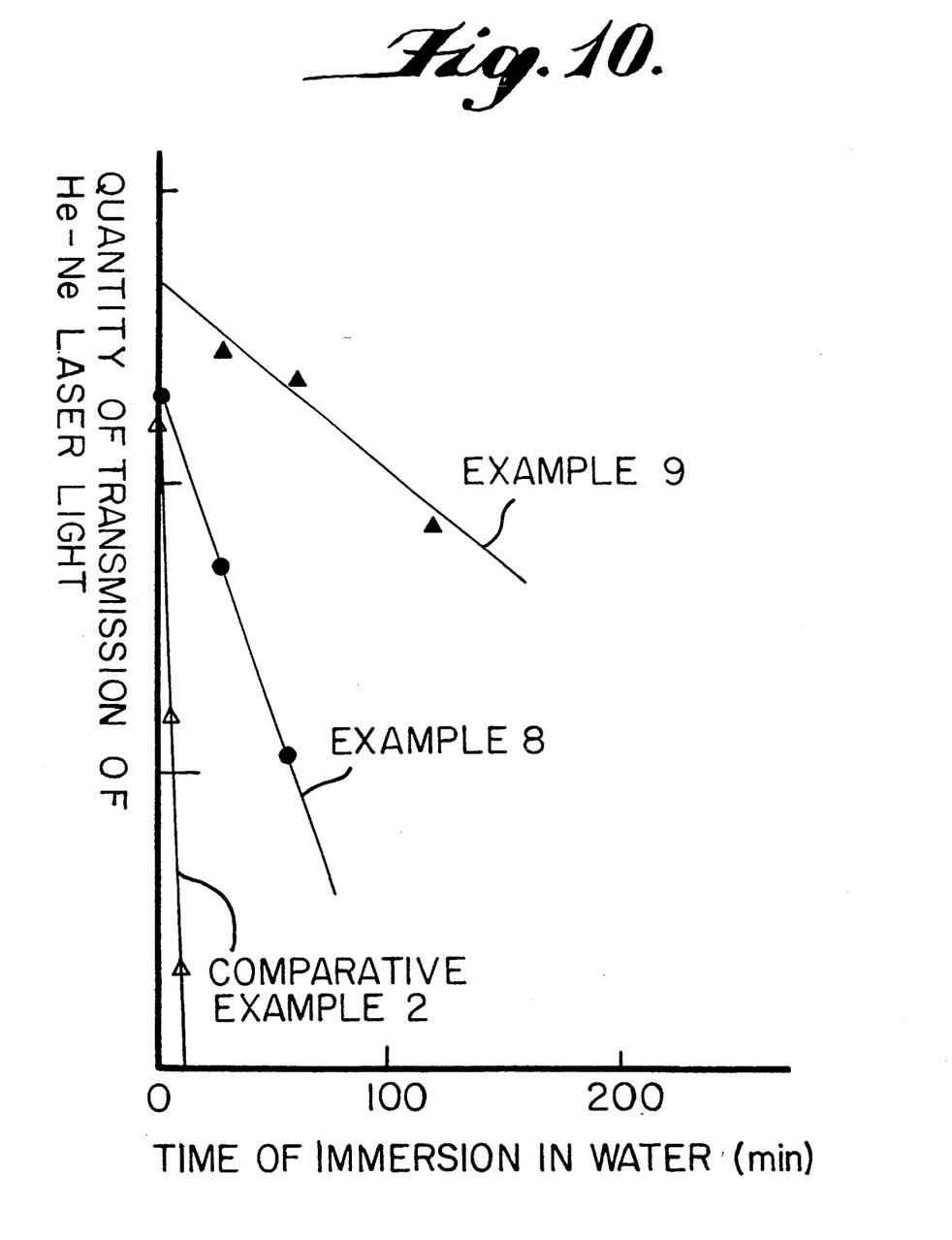
FIG. 10 is a graph showing the results of tests conducted to evaluate the deterioration characteristics of the devices fabricated in Examples 8 and 9 and Comparative Example 2.

An optical fiber unit composed of DMNP and SF11 glass was fabricated in the same manner as in Example 1. The unit was cooled to 0° C. and cut within the chamber of a vacuum evaporator ($1 \times 10^{-4}$ Torr). Immediately thereafter, SiO$_2$ was deposited on one end face at a rate of 10 Å/sec to form a film in a thickness of 1,500 Å. A SiO$_2$ film was also formed at the other end face to produce an optical fiber light wavelength converter device having a length of 3 mm. The converter device was evaluated in the same manner as in Example 1. The results obtained are shown in FIG. 10.

EXAMPLE 8

An optical fiber light wavelength converter device was fabricated in the same manner as in Comparative Example 2 except that prior to SiO$_2$ evaporation, the optical fiber unit was exposed to a vapor of hexamethylsilazane ($1 \times 10^{-3}$ Torr) for 2 min and, following re-evacuation, SiO$_2$ was evaporated to deposit a de-reflection film (thickness: 1,000 Å) for He—Ne laser. The resulting converter device was evaluated in the same manner as in Example 1. The results obtained are shown in FIG. 10.

EXAMPLE 9

An optical fiber light wavelength converter device was fabricated in the same manner as in Example 8. The device was exposed to a vapor of CF$_3$(CF$_2$)$_5$CH$_2$CH$_2$SiCl$_3$ ($1 \times 10^{-3}$ Torr) for 5 min and returned into the air atmosphere. The resulting converter device was evaluated in the same manner as in Example 1. The results obtained are shown in FIG. 10.

EXAMPLE 10

Figure 11:
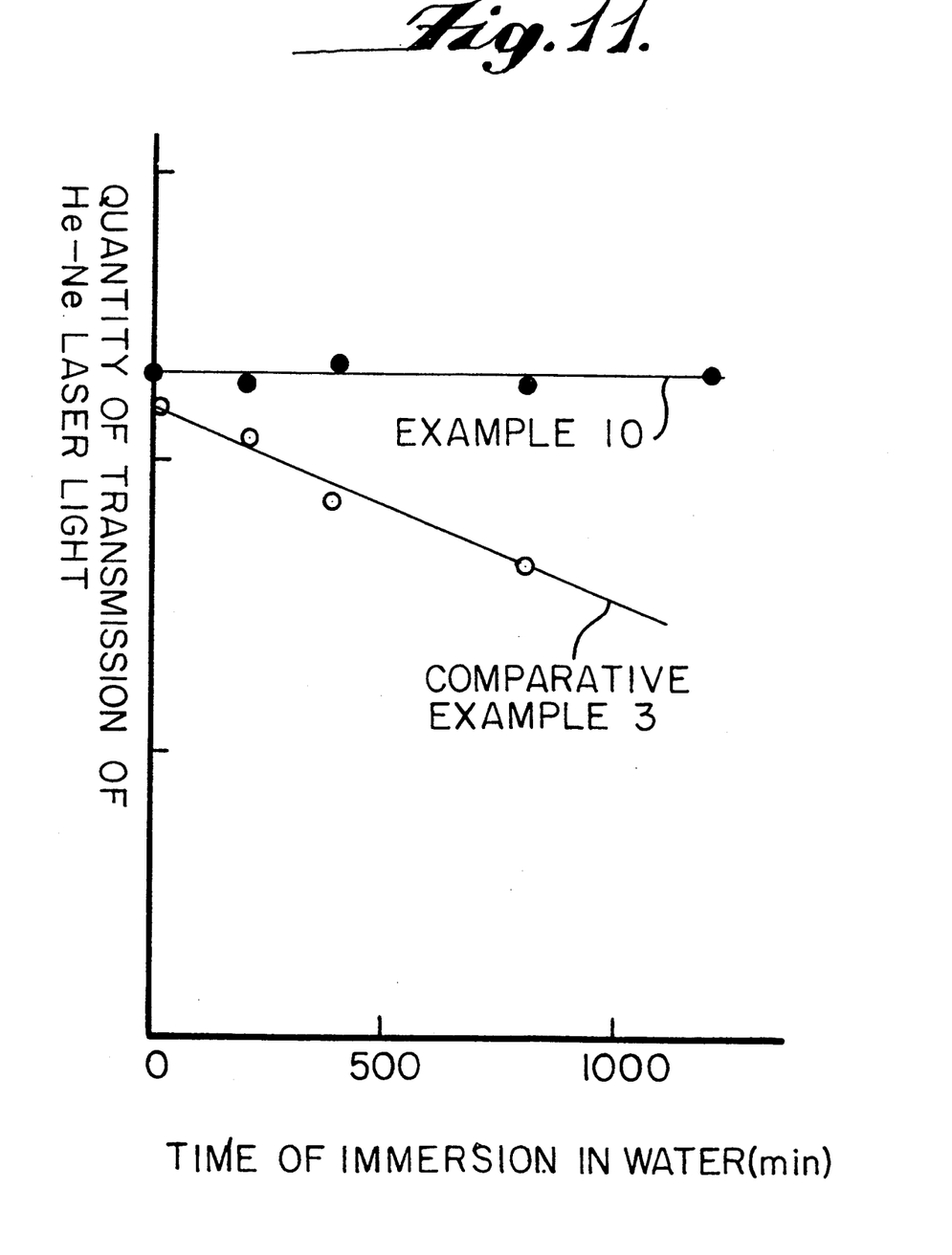
FIG. 11 is a graph showing the results of tests conducted to evaluate the deterioration characteristics of the devices fabricated in Example 10 and Comparative Example 3.

An optical fiber light wavelength converter device having a buffer layer and a water barrier layer at both end faces to give a total length of 3 mm was fabricated in the same manner as in Example 1 except that DMNP was replaced by DAN and the core diameter of the SF11 glass capillary was changed to 2 μm. The resulting converter device was evaluated in the same manner as in Example 1. The results obtained are shown in FIG. 11.

COMPARATIVE EXAMPLE 3

A fiber optics light wavelength converter device was fabricated in the same manner as in Example 10 except that no fluorine-containing polymer composition was applied. The resulting converter device was evaluated in the same manner as in Example 1. The results obtained are shown in FIG. 11.

EXAMPLE 11

An optical fiber unit composed of DMNP and SF11 glass was fabricated in the same manner as in Example 1, and buffer layers having a thickness of 500 Å on both end faces in the same manner as in Example 1. SiO$_2$ was evaporated in the same manner as in Example 2 on both the buffer layers at a rate of 50 Å/sec to form a de-reflection film having a thickness of 1,000 Å. He—Ne laser light was guided into the resulting converter device to evaluate its coupling efficiency, and it was found to have improved by 5% over the device of Example 2.

As described on the foregoing, the optical fiber device of the present invention comprises an optical fiber comprising a core made of an organic crystal and a cladding made of glass, and further comprises a buffer layer on at least one end faces of the optical fiber, and a water barrier layer on the surface of said buffer layer. The buffer layer is such that the organic crystal of the core is not dissolved therein. This arrangement effectively protects the device against deterioration by insuring that aerial moisture will not enter the core crystal.

While the invention has been described in detail and with reference to specific embodiments thereof, it will be apparent to one skilled in the art that various changes and modifications can be made therein without departing from the spirit and scope thereof.

What is claimed is:

1. An optical fiber device comprising an optical fiber comprising a core made of an organic crystal and a cladding made of glass, said device generating second harmonics of a laser light that has been launched into said core, said device further comprising a buffer layer on at least one end faces of said optical fiber, and a water barrier layer on the surface of said buffer layer, said buffer layer being such that said organic crystal of said core is not dissolved therein.

2. An optical fiber device as claimed in claim 1, wherein said buffer layer and said water barrier layer form a de-reflection film.

3. An optical fiber device as claimed in claim 1, wherein said optical fiber device further comprises a protective film on the surface of said water barrier layer.

4. An optical fiber device as claimed in claim 3, wherein said optical fiber device further comprises a de-reflection film on the surface of said protective layer.

5. An optical fiber device as claimed in claim 3, wherein said protective layer functions as a lens for collimating said second harmonics.

6. An optical fiber device as claimed in claim 3, wherein said protective layer covers not only the end face of the fiber but also part of its lateral side.

7. An optical fiber device as claimed in claim 1, wherein said buffer layer comprises a monomolecular layer of a silane coupling agent and a silicone composition film formed on said monomolecular layer.

* * * * *